United States Patent Office 2,880,042
Patented Mar. 31, 1959

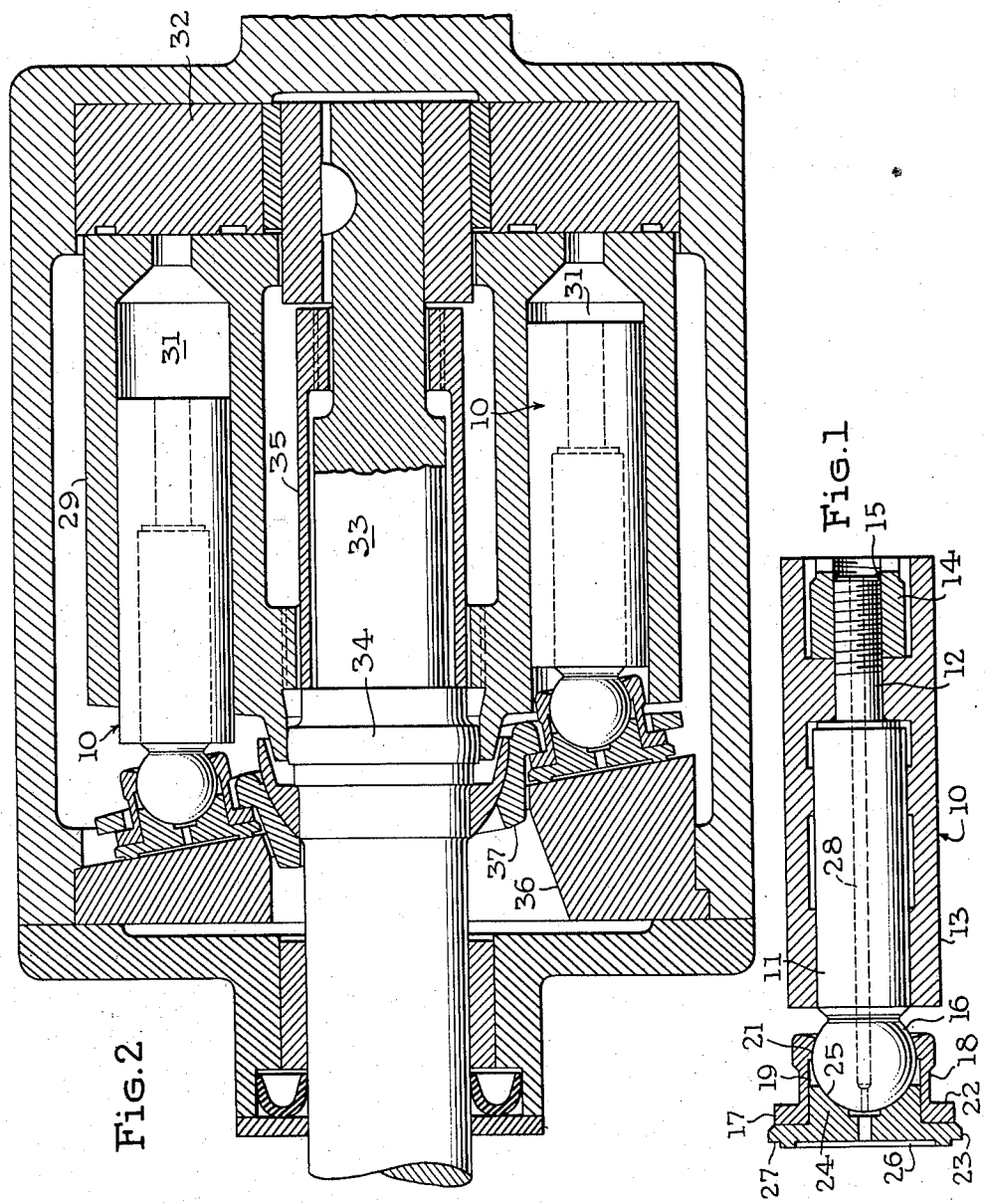

2,880,042
PISTON

Tadeusz Budzich, Watertown, N.Y., assignor to The New York Air Brake Company, a corporation of New Jersey Application June 20, 1957, Serial No. 666,856

3 Claims. (Cl. 309—1)

This invention relates to pistons and particularly to the pistons employed in those fluid pressure engines wherein reciprocation is effected by means of an inclined cam plate and a nutating plate. The term engine is used herein to mean a device which can operate as either a pump or a motor.

In most engines of the type mentioned, each piston is provided with a spherical head at one end for universally supporting a piston shoe which cooperates with the cam plate and the nutating plate to reciprocate the piston. The shoe contains a circular bore having a spherical end and after the piston head is inserted into the bore, the open end of the shoe is swaged around the head on the piston side of the equatorial plane extending in a direction normal to the piston axis. In high performance engines, these pistons have been a source of trouble because the swaged portion of the shoe fails, thereby allowing the shoe and the piston to separate. The reason for the failure becomes apparent when it is remembered that when the piston is moving on its suction stroke, the nutating plate applies tensile loads to the shoe which are transmitted through the swaged portion to the piston head. Since the shoe must have thin walls and be made from a relatively ductile material in order for it to be swaged, it can be seen that the shoe design represents a compromise between two conflicting interests. Consequently, the magnitude of the tensile load which can be taken by the shoe is limited. This problem is particularly serious in those engines which must operate in high temperature environments because, as is well known, the tensile strength of a material decreases as its temperature rises. Another disadvantage of these shoes is the fact that the material providing the best compromise between tensile strength and swaging characteristics, may not have the wear characteristics required by the bearing surface of the shoe contacting the cam plate.

The object of the present invention is to provide a piston-shoe combination capable of affording the optimum tensile force transmitting link between the nutating plate and the piston head while also affording the optimum wear surface on the bearing face of the piston shoe. Briefly, the invention comprises a two-part shoe in which each part engages the surface of the piston head on opposite sides of the equatorial plane extending in a direction normal to the axis of the piston. In this way, one part will transmit only compressive loads to the piston and the other will transmit only tensile loads. The tensile force transmitting portion is provided with a machined spherical surface for engaging the head and consequently, this part can have thick walls and be made of a material having as high a tensile strength as is necessary. On the other hand, the compressive load transmitting portion, which functions as the bearing member contacting the cam plate, can be made from a material having ideal wear characteristics since it transmits no tensile loads. Thus, since each portion performs only one function, the need for compromises is eliminated and each portion can be made from the best available material for accomplishing its particular function.

The preferred form of the invention will now be described in relation to the accompanying drawing, in which:

Fig. 1 is a longitudinal cross-section of the preferred piston-shoe combination.

Fig. 2 is an axial section of a fixed displacement engine utilizing the embodiment of Fig. 1.

Referring to Fig. 1, the piston 10 comprises a central core 11 having at its right end a threaded stem 12 which extends through a wear sleeve 13 surrounding the core. The sleeve 13 is held on the core by a nut 14 which, when threaded on the stem 12, forces mating shoulders on the core and sleeve into contact. The nut is secured in place by welds 15. Formed integrally with core 11 at its left end is a spherical head 16 centered on the longitudinal axis of the core. A piston shoe 17 is universally seated on the head 16.

Piston shoe 17 comprises a collar 18 having a central bore 19 dimensioned to encircle freely the head 16. The right end of the central bore contains a machined spherical surface 21 which engages a portion of the surface of spherical head 16 located on the piston side of the equatorial plane extending in a direction normal to the axis of core 11. Since the core 11 and head 16 must be inserted through the collar 18 during assembly, the minimum diameter of spherical surface 21 must be greater than the diameter of core 11, and the diameter of bore 19 must be greater than the diameter of head 16. The opposite end of collar 18 carries an integral outstanding annular flange 22. A bearing member 23 abuts against the left face of flange 22 and carries a centrally projecting portion 24 which is snugly received within central bore 19 of the collar 18. The end face of the portion 24 contains a spherical recess 25 which is arranged to engage a portion of the surface of head 16 located to the left of the above-mentioned equatorial plane. The left face of the bearing member 23 contains a central recess 26 and annular groove 27. The central recess 26 communicates with a restricted longitudinal passage 28 formed in core 11 for hydrostatically balancing the piston forces in the usual way.

Fig. 2 illustrates the pistons 10 installed in a typical fluid pressure engine. This engine comprises a housing containing a rotary cylinder barrel 29 which is formed with a circumferential series of longitudinal cylinder bores 31 for receiving the pistons 10. The right face of the cylinder barrel is in abutment with a conventional ported valve plate 32 which sequentially transmits pressure fluid to and from the bores 31 as the cylinder barrel rotates. A drive shaft 33, having a spherical enlargement 34 for laterally supporting cylinder barrel 29, is connected in driving relation with the barrel by torque tube 35. This method of supporting and driving the cylinder barrel is more fully disclosed and claimed in applicant's copending application Serial No. 656,574, filed May 2, 1957. A cam plate 36 and nutating plate 37 coact with piston shoes 17 to reciprocate pistons 10 in a well known manner.

While the pistons of this invention are useful in either pumps or motors, the following description will relate to their use in an engine which is serving as a pump. Accordingly, as cylinder barrel 29 is rotated by shaft 33 through torque tube 35, the shoes 17, under the action of cam plate 36, will move pistons 10 on their discharge strokes against the force of the pressure fluid in bores 31. This force will be transmitted through piston core 11 and head 16 to bearing member 23 and thence through the fluid film in and around recess 26, to the cam plate 36. No part of this compressive force is taken by collar 18 because member 23 is free to slide in bore 19. As each piston completes the discharge stroke, the nutating plate 37 moves it to the left on the suction stroke against the inertia force of the piston itself. The accelerating force applied by the nutating plate is transmitted to piston core 11 by collar 18, spherical surface 21 and head 16. Since no portion of the surface 25 of bearing member 23 extends on the piston side of the previously-mentioned equatorial plane, this tension force is carried solely by the collar 18. It can now be seen that each of the two portions of the shoe 17 performs only a single function and therefore, the design and material used in each portion can be selected to insure optimum performance of the function assigned to the particular portion.

It should be noted that since the diameter of core 11 is limited by the minimum diameter of spherical surface 21, it is necessary to use a surrounding sleeve, such as wear sleeve 13, to satisfy the flow requirements of most engines. While this may appear to be a disadvantage, actually it is an advantage because, by properly selecting the materials used in the core and in the sleeve, it is possible to provide a piston having a combination of load carrying and wear characteristics not obtainable in an homogeneous piston.

As stated previously, the drawings and description relate only to a preferred embodiment of the invention. Since many changes in the structure of this embodiment can be made without departing from the inventive idea, the following claims should provide the sole measure of the scope of the invention.

What is claimed is:

1. In an engine of the type including a circular series of cylinder bores for receiving reciprocable pistons, and a nutating plate and cam plate for moving the pistons on their inlet and discharge strokes, the improvement which comprises a composite piston reciprocable in each bore, each piston having a central core and a removable wear sleeve surrounding the core and connected to it; a spherical head formed as an integral part of each core at one of its ends and centered on the axis of the core; collars, one for each piston and each having a central bore dimensioned to encircle freely the spherical head; a spherical surface at one end of each central bore and engaging a portion of the head surface located on the piston side of the equatorial plane extending in a direction normal to the axis of the core, the minimum diameter of this surface being greater than the diameter of the piston core; an outstanding annular flange formed as an integral part of each collar at its opposite end, the piston side of each flange abutting the nutating plate whereby each collar transmits only tensile forces between its piston and the nutating plate; and a bearing member abutting each flange on the side opposite the nutating plate and having a bearing surface in sliding engagement with the cam plate, each bearing member also having a central projecting portion slidable within the central bore of the collar and formed with a spherical recess in its end face which engages a portion of the head surface located on the side of said equatorial plane opposite to the piston, whereby the bearing members transmit only compressive forces between the cam plate and the pistons.

2. In an engine of the type including a circular series of pistons, each having a spherical head at one end, and a nutating plate and cam plate for moving the pistons on their inlet and discharge strokes, respectively, the improvement which comprises a piston shoe universally mounted on each piston head for providing operative connections between the pistons and the nutating plate and cam plate, each shoe having two separate portions, namely, a first portion which transmits only tensile forces between the nutating plate and the piston and comprises a collar formed with a spherical surface which engages a portion of the head surface located on the piston side of the equatorial plane extending in a direction normal to the axis of the piston and an outstanding flange which engages the nutating plate, and a second portion which transmits only compressive forces between the cam plate and the piston and comprises a bearing member formed with a spherical surface which engages a portion of the head surface located on the side of said equatorial plane opposite to the piston and a bearing surface which is in sliding engagement with the cam plate.

3. In an engine of the type including a circular series of pistons and a nutating plate and cam plate for moving the pistons on their inlet and discharge strokes, respectively, the improvement which comprises a piston shoe universally connected to one end of each piston for providing an operative connection between the piston and the nutating plate and cam plate, each shoe having one portion which is in sliding engagement with the cam plate and which transmits only compressive forces between the cam plate and the piston, and a separate second portion which engages the nutating plate and transmits only tensile forces between the nutating plate and the piston.

References Cited in the file of this patent

UNITED STATES PATENTS

| 323,805 | Griscom | Aug. 4, 1885 |
| 1,275,494 | Storle | Aug. 13, 1918 |
| 2,638,850 | Ferris | May 19, 1953 |